2,943,999
START-UP OF PLATINUM CATALYST HYDROFORMERS

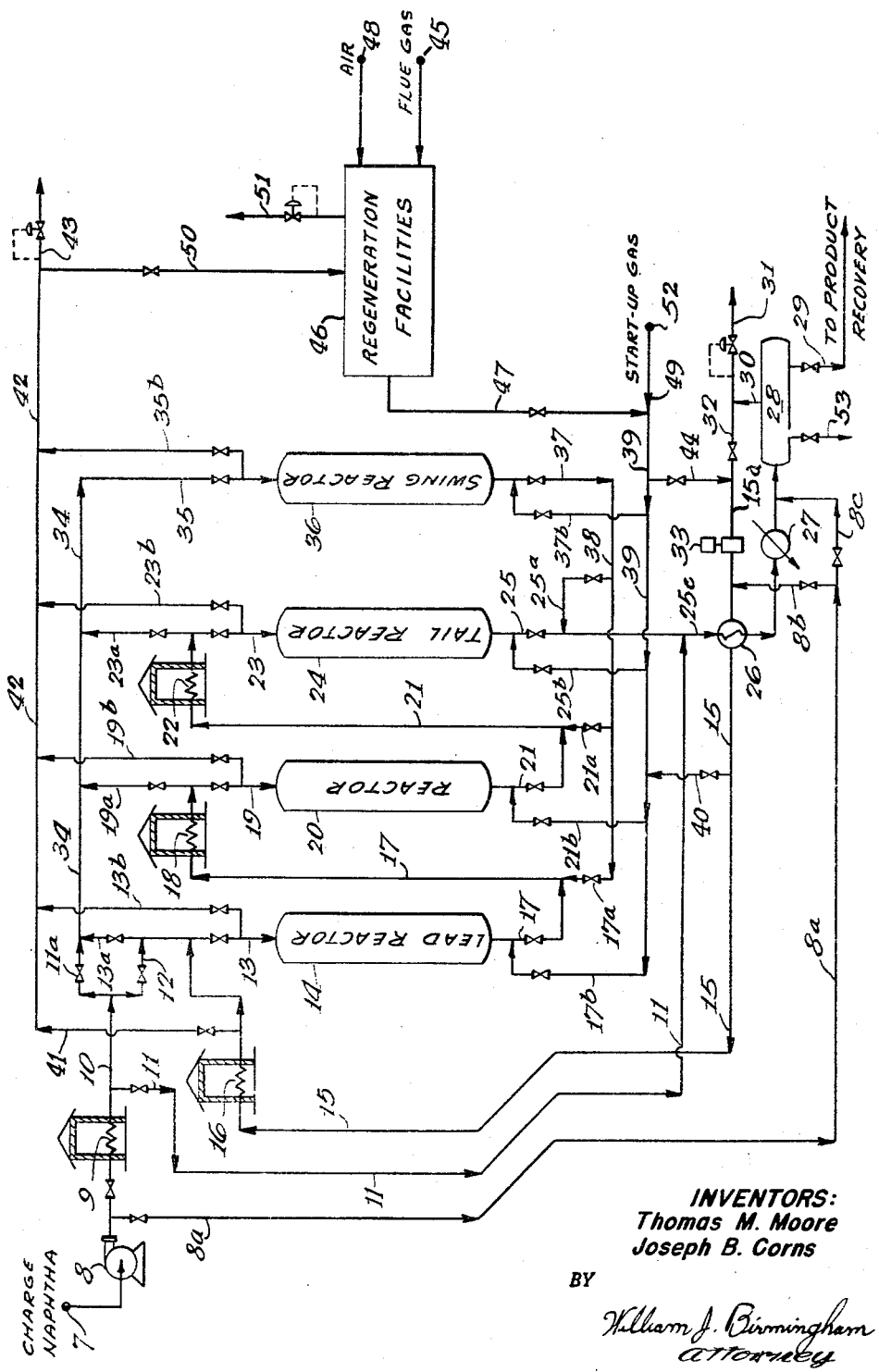

Thomas M. Moore, Munster, and Joseph B. Corns, Griffith, Ind., assignors to Standard Oil Company, Chicago, Ill., a corporation of Indiana Filed Feb. 15, 1957, Ser. No. 640,468

10 Claims. (Cl. 208—65)

This invention relates to an improved start-up procedure for platinum catalyst hydroforming systems, and it pertains more particularly to a method for start-up of hydroforming systems in which platinum-alumina catalyst is contaminated with adsorbed carbon oxides.

The start-up of a platinum catalyst hydroformer requires considerable care in order to avoid catalyst deactivation. Heretofore, hydrogen has been considered a desirable start-up gas. However, when carbon oxides are present in the reaction zone or the catalyst contains adsorbed carbon oxides, such as would result from purging operations with flue gas at temperatures below about 450–500° F., hydrogen has been found to be unsuitable because it reduces carbon dioxide to carbon monoxide, which poisons platinum catalyst for hydroforming, and forms water, which tends to strip promoter components from the catalyst and aggravates corrosion problems. A single purging with a hydrogen-free start-up gas, such as, bottled nitrogen or normally-gaseous hydrocarbons, removes carbon oxides in the reaction system without poisoning the catalyst, but upon heating of the catalyst bed, surprisingly large volumes of carbon oxides are desorbed from the alumina of the catalyst up to a temperature of about 450–500° F. Repeated purges and/or evacuations of the reactors with additional start-up gas are thus required until substantially all carbon oxides are eliminated. Such procedures are, of course, troublesome and expensive, particularly where the start-up gas must be purchased elsewhere and imported into the refinery.

An object of this invention is to provide an improved start-up procedure for platinum catalyst hydroforming systems which minimizes catalyst deactivation. Another object is to provide a procedure for starting up hydroforming systems with platinum-alumina catalyst containing adsorbed carbon oxides. Another object is to provide a start-up procedure which minimizes the quantity of extraneous start-up gas required. A further object is to provide a start-up procedure which will minimize loss of promoter components from the catalyst and decrease corrosion problems. These and other objects will be apparent as the detailed description of the invention proceeds.

Platinum catalyst hydroforming systems used in commercial practice today include lead, intermediate, and tail reactors, heating zones prior to each of these reactors, a gas separation zone after said reactors, and compressor and lines for recycling separated gas. Regenerative platinum catalyst hydroforming systems, as exemplified by Ultraforming (Petroleum Engineer, vol. XXVI, No. 4, April 1954, at page C–35), are also provided with a swing or spare reactor and regeneration facilities, including sources of flue gas and air, means for removing water from regeneration gases, a circulator, and valved lines whereby the regeneration facilities may be connected to the reaction zones when platinum catalyst requires reactivation.

We have discovered a start-up procedure for such platinum catalyst hydroformers which copes with the problem of carbon monoxide poisoning and doesn't require repeated purging of reactors with costly start-up gas during heat-up to remove desorbed carbon oxides. Our method of start-up utilizes inexpensive and readily-available flue gas to desorb carbon oxides. Thereafter, the reaction system needs only be filled once with a start-up gas, rather than many times.

In one embodiment our method comprises the steps of purging the naphtha hydroforming zone with flue gas, circulating flue gas containing between about 0.1 and 1.0 mol percent oxygen through said zone at a pressure in excess of about 30 pounds per square inch gage while simultaneously heating the circulating flue gas to a temperature above about 500° F., depressuring, introducing a start-up gas into said zone whereby the partial pressure of carbon oxides in said zone is reduced below about 1 pound per square inch absolute, introducing preheated naphtha charge stock at a temperature in the range of 650 to 800° F. into said zone while the pressure of the startup gas is in the range of about 30 to 200 pounds per square inch gage, continuing the introduction of naphtha charge stock at a temperature in said range until the hydrogen partial pressure in said zone is increased to at least about 150 pounds per square inch gage, and then increasing the temperature of the naphtha charge to at least about 850° F. Start-up gases for purposes of this invention are nitrogen and normally-gaseous hydrocarbons, such as, methane (natural gas), ethane, propane (liquified petroleum gas), and mixtures thereof. Such gases should be substantially free of hydrogen, which, upon being introduced into the reaction zone to displace flue gas, would reduce carbon dioxide to carbon monoxide and thereby poison the catalyst. Where there has been no substantial buildup of carbon oxides in circulating flue gas, however, and, in particular, where the reaction system is evacuated after depressuring, hydrogen may be tolerated without substantial deactivation.

In practicing our invention, the flue gas, which is normally the products from combustion of hydrocarbons in air, is circulated at a pressure in excess of 30 pounds per square inch gage, e.g., 300 pounds per square inch gage, to provide sufficient suction pressure for the hydroformer recycle compressor and to provide adequate gas circulation for rapid heat-up. During flue gas circulation the carbon oxide concentration will rise with increased temperature as more and more carbon oxides are desorbed from the catalyst. To minimize this build-up of carbon oxides in the circulating flue gas, additional flue gas may be introduced while portions of the circulating flue gas are vented from the system. The flue gas should contain between about 0.1 to 1 mol percent of oxygen, preferably about 0.2 to 0.5 mol percent, to assure substantially complete absence of carbon monoxide. Oxygen content, however, should not rise above about 1 mol percent; otherwise hazardous conditions may result, particularly when start-up gas is introduced. Furthermore, in systems contaminated with metallic sulfides, excess oxygen may lead to oxidation of the sulfur and consequent sulfation of the catalyst base.

When the catalyst bed has been heated to a temperature of about 500° F., substantially all carbon oxides are desorbed from the catalyst. The system may then be depressured to atmospheric pressure and, preferably, evacuated to a pressure below atmospheric pressure before introducing start-up gas. Such depressuring and/or evacuation minimizes the amount of start-up gas required to reduce the partial pressure of carbon oxides in the reaction zone to a level below about 1 pound per square inch absolute, which level has been found from experience to cause negligible catalyst deactivation. Evacuation is particularly desirable when start-up gas contains hydrogen to prevent any significant reduction of carbon dioxide to carbon monoxide.

After the startup gas is introduced, it should be circulated through the system to heat the catalyst to about 600–800° F. Alternatively, the catalyst may be heated to about 600–800° F. by circulation of the flue gas prior to depressuring, evacuation, and introduction of the start-up gas. Gases leaving the tail reactor may preferably be cooled to about 100° F., and condensed water removed in the gas separation zone. Experience has shown that temperatures of about 600–800° F., preferably 700–800° F., are required to assure substantially complete removal of water from the catalyst. The rate of heating should be controlled so that the amount of water in the gas circulating through the catalyst beds remains below about 5 mol percent, and preferably below 1 mol percent. Aqueous condensate removed in the gas separation zone may be corrosive and should be withdrawn. During this further heating-up and drying step a pressure in excess of about 30 pounds per square inch gage, e.g., about 200 pounds per square inch gage, is preferred to provide suction pressure for the recycle compressor and adequate heat capacity.

When the catalyst beds have been heated to about 600–800° F. by the recycled gas stream and substantially all water has been removed from the system, the pressure in the system may be reduced substantially below 200 pounds per square inch gage, e.g., about 30–150 pounds per square inch gage. Naphtha charge may then be slowly introduced. The catalyst bed in one of the reactors, preferably the swing reactor if the system includes one, may be raised to a somewhat higher temperature of about 750–800° F., usually not higher than about 800° F., while the remaining reactors may be maintained at a somewhat lower temperature of about 650–750° F. In a non-regenerative system, the initial dehydrogenation may be effected at temperatures somewhat lower than those stated hereinabove. Thus, one reactor may be maintained at a temperature in the range of about 650–750° F., while the remaining reactors are held at a temperature less than about 650° F., e.g., 600–650° F.

In a system including a swing reactor a preferred operation is to connect the swing reactor in tail reactor position so that while start-up gas is being circulated in the rest of the system, naphtha preheated to about 750–800° F. is introduced directly into the swing reactor and the effluent therefrom is discharged directly through heat exchangers to the hydrogen separator. The hydrogen thus formed in the swing reactor is recycled through the whole system and its concentration in the recycled gas rapidly reaches 80 percent or more. When the hydrogen partial pressure reaches the desired level, e.g., about 150 pounds per square inch gage, or more, the incoming naphtha charge at about 800° F. transfer line temperature is cut into the first reactor for on-stream flow through regular on-stream reheaters and reactors. The catalyst in the on-stream reactors is thus protected by hydrogen initially generated in the swing reactor. As soon as the system is brought to the desired pressure of operation, e.g., about 300 pounds per square inch gage, the temperature of the initial heater and reheaters is increased from about 800° F. to about 850–1000° F., e.g., about 920° F., and the system is thus gradually brought to on-stream operating conditions.

By heating up with flue gas, rather than start-up gas, desorbed carbon oxides are removed, thereby avoiding contamination of start-up gas and the necessity for repeated purging. By using flue gas with a small amount of oxygen, e.g., 0.3 mol percent, for drying and establishing circulation and initial preheating conditions, catalyst activity is protected. By introducing a substantially hydrogen-free start-up gas to displace flue gas, carbon dioxide in flue gas is not reduced by hydrogen to carbon monoxide, which poisons platinum catalyst. The importance of removing the unexpectedly-large amounts of desorbed carbon oxides before starting up a platinum-alumina catalyst hydroforming system has been demonstrated repeatedly by commercial experience. For example, in one commercial Ultraformer an essentially pure start-up gas became contaminated with about 5 to 10 percent carbon oxides which were desorbed from platinum-alumina catalyst during heating. Attempted start-up under such conditions resulted in complete failure and deactivation of all catalyst beds.

By maintaining the moisture content of circulating gases below about 5 mol percent, loss of promoter components from the catalyst is minimized. By initiating the introduction of charging stock at low temperature and low pressure, carbon formation is minimized. Any carbon deposited on the catalyst during initial generation of hydrogen is limited to the catalyst in the reactor operating at higher temperature, preferably the swing reactor. Hydrogen produced in this reactor will be adequate to prevent appreciable carbon formation in the remaining reactors when charge is introduced thereto. In systems including a swing reactor operating at the higher temperature, the swing reactor may subsequently be cut out of the system, the catalyst therein may be regenerated, if needed, and the other reactors will remain on-stream without necessity for regeneration for a longer period of time.

In a preferred embodiment of our invention, we start up a platinum-alumina catalyst naphtha hydroforming system, including lead, intermediate, and tail reaction zones, heating zones prior to each of said reaction zones, a gas separation zone after said reaction zones, and compression means and lines for recycling separated gas, by purging said reaction zones with flue gas containing about 0.2 to 0.5 mol percent oxygen, circulating said flue gas through said reaction zones at a pressure in excess of about 30 pounds per square inch gage while simultaneously heating the circulating flue gas to a temperature in the range of about 700 to 800° F., continuing circulation of said flue gas through said reaction zones at a temperature in said range while simultaneously cooling said flue gas leaving said tail reaction zone to condense water therefrom and separating the condensed water from said flue gas in said gas separation zone, depressuring, introducing a substantially hydrogen-free start-up gas into said reaction zones whereby the partial pressure of carbon oxides in said reaction zones is reduced below at least about 1 pound per square inch absolute, introducing preheated naphtha charge stock at a temperature in the range of 700–800° F. into said reaction zones, one of which reaction zones is at a higher temperature than the remaining reaction zones, while the pressure of the start-up gas is in the range of about 30 to 200 pounds per square inch gage, continuing the introduction of naphtha charge stock at a temperature in said range until the partial pressure of hydrogen reaches at least about 150 pounds per square inch gage, and then increasing the temperature of the naphtha charge to at least about 850° F.

The invention will be more clearly understood by reference to the following example read in conjunction with the accompanying drawing which is a schematic flow diagram of an Ultraforming system in which our start-up procedure is particularly advantageous.

In normal operation of an Ultraforming system a naphtha charge such, for example, as the 150 to 360° F. fraction of a Mid-Continent virgin naphtha is introduced from source 7 by pump 8 through preheater 9 and transfer line 10 from which the preheated charge may be by-passed by line 11 to the product recovery system during start-up procedure. In on-stream operation transfer line 10 will discharge through lines 12 and 13 to reactor 14 along with recycled hydrogen from line 15 which is preheated in heater 16. Effluent from reactor 14 passes through line 17, reheater 18, and transfer line 19 to reactor 20. Effluent from reactor 20 passes through line 21, reheater 22, and transfer line 23 to tail reactor 24.

It should be understood that more than three reheater-reactor stages may be employed in the system.

Effluent from the tail reactor flows through lines 25 and 25c, heat exchanger 26 and cooler 27 to separator 28 from which hydroformed product is withdrawn through line 29 to a stabilizer and/or conventional product recovery system. A part of the hydrogen withdrawn from the separator through line 30 may be vented through line 31 but usually about 1,000 to 10,000 cubic feet per barrel of charge is recycled through lines 32 and 15a by means of circulating compressor 33 to line 15.

Transfer lines 11a, 13a, 19a and 23a may be selectively connected to header 34 for discharging through line 35 to swing reactor 36, the effluent from which passes through line 37 to header 38 and thence through line 17a to line 17, line 21a to line 21, or line 25a to line 25. During normal on-stream operation without the swing reactor the valves in lines 11, 11a, 13a, 13b, 17a, 17b, 19a, 19b, 21a, 21b, 23a, 23b, 25a and 25b remain closed, and the valves in lines 12, 13, 17, 19, 21, 23 and 25 remain open.

The swing reactor may be substituted for the lead reactor by opening valves in lines 13a, 35, 37 and 17a and closing valves in lines 13 and 17. Alternatively, it may be substituted for intermediate reactor 20 by opening valves in lines 19a, 35, 37 and 21a and closing the valves in lines 19 and 21. The swing reactor may take the place of the tail reactor by opening valves in lines 23a, 35, 37 and 25a, and closing valves in lines 23 and 25. It will thus be seen that each of the reactors may be taken off-stream for regeneration and replaced by the swing reactor and that, alternatively, the swing reactor may be connected to operate in parallel with any of the other on-stream reactors during periods when no regeneration is required.

In some Ultraforming systems the hydrogen-rich recycle gas and the naphtha charge are heated in the same preheater. In such systems the charge introduced by pump 8 may be introduced by lines 8a and 8b to line 15 just ahead of heat exchanger 26 during normal operation and may be introduced by line 8a and line 8c to the line entering separator 28 prior to start-up.

Each of the reactors is provided with a refractory lining of low iron content, and metal surfaces may preferably be aluminized. They may each contain about the same amount of catalyst although, if desired, the subsequent reactors may contain somewhat more catalyst than the initial reactors. The catalyst may be of any known type of platinum-alumina catalyst. It may be prepared by compositing a platinum chloride with an alumina support as described, for example, in U. S. Patent 2,659,701, and it preferably contains about .1 to .8 weight percent of platinum.

The on-stream pressure is usually below about 400 pounds per square inch gage, i.e. in the range of 200 to 350 pounds per square inch gage. The inlet temperatures to each reactor are usually in the range of about 850 to 1000° F., e.g. about 920° F., and may be approximately the same for each reactor although it is sometimes desirable to employ somewhat lower inlet temperature to the initial reactor than to the remaining reactors. The overall weight space velocity may be in the range of about 0.5 to 5 pounds of naphtha per pound of catalyst per hour. There is, of course, a pressure drop in the system so that the lead reactor may operate at about 25 to 100 pounds per square inch higher pressure than the tail reactor.

Prior to regeneration hot hydrogen-rich gas for stripping hydrocarbons from catalyst in a blocked-out reactor may be introduced by line 41 to manifold line 42 and thence through one of lines 13b, 19b, 23b, or 35b to the selected reactor. Also, hydrogen-rich gas may be introduced from line 15 to manifold line 39 via line 40.

For effecting purging and regeneration of the catalyst in any bed, purge gases and regeneration gases may be introduced through manifold line 39 and a selected one of lines 17b, 21b, 25b and 37b. Such purge and regeneration gases may be selectively withdrawn through lines 13b, 19b, 23b and 35b to manifold line 42 from which gases may be vented or flared through line 43. Purge and regeneration gases from manifold line 39 may be introduced to the inlet of circulating compressor 33 by lines 44 and 15a.

Flue gas from source 45, which typically contains about 9 to 12 percent carbon oxides, about 18 to 14 percent water, and about 73 to 74 percent nitrogen, may be introduced to the system via regeneration facilities 46, which may contain compression facilities, furnaces, heat exchangers, gas purifiers and the like, and valved line 47 to manifold line 39, and also to compressor 33 via lines 44 and 15a, when it is desired to introduce flue gas into the system for startup, purging, and/or regeneration. Since carbon monoxide poisons platinum-alumina catalyst, particularly at high partial pressure, flue gas should also contain a small amount of oxygen (less than 1 mol percent) so that carbon oxides are present in the form of carbon dioxide. This is particularly important when contacting platinum-alumina catalyst with flue gas at high pressure, but is less important at pressures not substantially above atmospheric, for instance, during a flue gas purge at atmospheric pressure. Air may also be introduced from source 48 via regeneration facilities 46 for effecting regeneration and/or regeneration-rejuvenation of the catalyst.

In starting up this system in accordance with our invention the entire system is, of course, first checked for mechanical defects, cleaned out, dried, and the reactors are charged with catalyst. A layer of alumina balls is preferably placed on top of each of the catalyst beds to prevent swirling of the catalyst pellets which might otherwise lead to abrasion and production of catalyst fines. Flue gas from source 45 is next introduced into the system and passed via 46, 47, 39, 44, and 15a to the inlet of circulating compressor 33; and it is thereafter passed through all of the heaters, transfer lines and reactors, the flue gas being at this time purged from the system through line 31. The temperature of the flue gas during this purge may be below about 200° F., and the pressure is preferably about atmospheric, i.e., about 5 to 10 pounds per square inch gage.

After the initial flue gas purge, the system is pressured with flue gas to at least the desired operating pressure, e.g., to about 300 pounds per square inch gage, to check for possible leaks.

After pressure testing, the valve in line 31 is preferably then set to hold back the full operating pressure, e.g., 300 pounds per square inch gage, and the reaction side is isolated from the regeneration side by closing valves in lines 47 and 50. The flue gas in the reaction side is continuously circulated through all the reactors, in series or parallel, preferably series, by means of compressor 33. For the preferred series flow the flue gas after leaving compressor 33 would flow via 15, 16, 13, 14, 17, 18, 19, 20, 21, 22, 23, 24, 25, 25c, 26, 27, 28, 30, 32 and back to compressor 33 via 15a. The swing reactor is preferably connected in parallel with the tail reactor at this time. Thus, flue gas leaving furnace 22 would flow in part through line 23 to tail reactor 24, and in part through line 23a, 34, 35 to swing reactor 36. Flue gas leaving swing reactor 36 would pass via lines 37, 38, and 25a so as to again join the other portion of flue gas leaving tail reactor 24 in line 25.

The temperature of the circulating flue gas is increased by gradually firing furnaces 16, 18 and 22. Full operating pressure during this circulation step is preferred to assure sufficient circulation through furnaces and thereby avoid overheated tubes. The hot circulating gas effects drying of the catalyst and any further drying of the reactor linings that may be required. At the same time carbon oxides adsorbed on the platinum-alumina catalyst and linings are desorbed into the circulating gases. To avoid a very high concentration of carbon oxides in the circulating flue gas resulting from desorption of carbon oxides, fresh flue gas may be added to the circulating flue gas from source 45 via 46, 47, 39, and 44. At the same time circulating flue gas may be bled from the system via line 31, or, alternatively, via 35b and 42 to vent 43.

Water is separated from the circulating gases by condensation in cooler 27 and separated in separator 28 from which it may be withdrawn through line 53, the valve in line 29 being closed at this time. Heating up of the reaction system should be sufficinetly slow up to about 300° F. so that the gas will not pick up more than 5 mol percent water. After this initial drying step the temperature may be increased more rapidly to at least about 500° F., at which temperature substantially all physically-absorbed and chemi-absorbed carbon oxides are desorbed. At this point the circulating flue gas may be vented from the reaction side and displaced with start-up gas, e.g., methane, said start-up gas being substantially hydrogen-free, i.e., containing no more hydrogen than that equivalent to a hydrogen partial pressure in the reaction system of about 1 p.s.i.a. Of course, if the partial pressure of carbon oxides has already been reduced below about 1 p.s.i.a., higher hydrogen partial pressures, e.g., above about 45 p.s.i.a., are feasible. Alternatively, and preferably, the circulating flue gas may be further heated to a temperature in the range of about 600–800° F., preferably about 700–800° F., and then replaced with the start-up gas. In either case circulation of gases through the reaction side should be continued at a temperature in the range of about 600–800° F., preferably about 700–800° F., until no further appreciable amounts of water are removed from gas separation zone 28 via line 53.

With substantially all adsorbed carbon oxides removed by the circulating flue gas, the flue gas is removed from the system by depressuring via lines 31 or 43 and, preferably, by evacuation (facilities not shown). Start-up gas, which may further displace flue gas, is introduced to a pressure in excess of about 30 pounds per square inch gage from source 52 via line 49, 39, 44, and 15a to the inlet of compressor 33. Partial pressure of carbon oxides in the reaction system after introduction of start-up gas should be below about 1 pound per square inch absolute, a level which experience has shown to cause negligible deactivation. If the reaction side has not already been heated to a temperature of about 600–800° F., preferably about 700–800° F., the start-up gas should be circulated through the system to raise the temperature to that level by means of furnaces 16, 18, and 22. This circulation should, of course, continue until no further appreciable amounts of water are removed from gas separation zone 28 via line 53.

With essentially undiluted start-up gas being recycled through the reaction side, the valve in line 53 is closed and the valve in line 29 is opened. Naphtha preheater 9 is fired and charge naphtha preheated to about 800° F. is introduced through by-pass line 11 (the valves in lines 11a and 12 being closed) directly to product effluent line 25c from which it passes through exchanger 26, cooler 27, separator 28, and line 29 to the product recovery system for establishing operating conditions therein. If a single preheater is employed, naphtha charge in introduced at this time to the separator through lines 8a and 8c, the valve in line 8b being closed. Naphtha should not, of course, be introduced while flue gas is being circulated. Otherwise, naphtha vapors may be entrained by the flue gas in separator 28 and carried to the reaction system, thereby resulting in production of hydrogen, reduction of carbon dioxide to carbon monoxide, and poisoning of the catalyst.

The pressure of the hot circulating start-up gas if it is not already below about 200 pounds per square inch gage, should next be reduced to as low a pressure as is feasible, preferably to a pressure in the range of about 30 to 150 pounds per square inch gage, by adjustment of the pressure control valve in line 31. The lower limit on pressure is usually dictated by the minimum suction pressure of the recycle gas compressor 33. A low start-up gas pressure is desired from a process standpoint so that the partial pressure of hydrogen will increase as rapidly as possible, once naphtha is charged.

The catalyst in one of the reactors is preferably heated to about 750°–800° F., and the naphtha which is introduced into this reactor is preheated to about the same temperature so that the generation of hydrogen will largely be accomplished in a single vessel. When the swing reactor is employed for hydrogen generation and all catalyst beds have been heated to about 700–750° F. by circulating start-up gas, the valve in line 23 may be closed, the valve in line 23a opened and the temperature of heater 22 increased to provide a transfer line temperature of about 800° F. so that the swing reactor is thus heated to about 750–800° F. Next, with the pressure of the circulating start-up gas below about 200 pounds per square inch gage and preferably in the range of 30 to 150 pounds per square inch gage, the valves in lines 11a and 23 are opened, while valves in lines 11, 12 and 13a are closed. Naphtha vapors preheated to approximately 800° F. are introduced directly through lines 34 and 35 to the swing reactor while recycled gases are continuously circulated through heater 16, reactor 14, heater 18, reactor 20, heater 22 and reactors 24 and 36 (in parallel), the temperature of these heaters at this time being increased to bring the temperature of the lead and intermediate reactors up to about 800–850° F.

The hydrogen generated by dehydrogenation in the swing reactor will quickly increase the hydrogen concentration of the recycled gas to about 80 percent or more and the pressure in the system may be increased by the generated hydrogen to the desired operating pressure. As soon as the hydrogen partial pressure builds up to at least about 150 pounds per square inch gage, the valve in line 12 is opened and the valve in line 11a is closed so that the charge preheated to about 800° F. is now cut into the hot circulating hydrogen stream. The transfer line temperatures of heaters 9, 16, 18 and 22 may now be increased to the desired level, e.g. about 900–950° F. Thus, carbon deposition on the lead, intermediate, and tail reactors is substantially avoided by starting up with hydrogen produced in the swing reactor. If and when regeneration of the catalyst in the swing reactor is desired, the valve in line 35 is closed and sufficient hot hydrogen is available for stripping hydrocarbons therefrom via lines 41, 42 and 35b, after which the valves in lines 41, 37, and 25a are closed.

Instead of employing the swing reactor for initially generating hydrogen, the lead reactor, the tail reactor or, in fact, any of the on-stream reactors may be preheated to a temperature of about 750–800° F. by raising the temperature of the appropriate heater, and the system may be brought on-stream by introducing charging stock at about 700° F. to all of the reactors except the preheated reactor for which the start-up inlet temperature is preferably about 750–800° F. With this method of start-up, line 11a is not required and the preheated naphtha may be introduced to line 13 and reactor 14 via transfer lines 10 and 12 when a separate preheater 9 is employed or may be introduced via lines 8a, 8b, and 15 when hydrogen and naphtha are preheated in the same heating coil.

In this embodiment one reactor, e.g., the swing reactor, is preferably blocked out during the initial start-up and the inlet temperatures to the reactors which are at about 700–750° F. should not be increased until the hydrogen partial pressure has reached about 150 pounds per square inch gage. When the circulating start-up gas has thus been essentially replaced by hydrogen and the partial pressure of the hydrogen has been increased to at least about 150 pounds per square inch gage, all transfer line temperatures may be increased to the desired operating level and any further increase in pressure may be built up so that on-stream operating conditions are fully established. In this case, the reactor which has operated at the initially high temperature and in which most of the carbon deposition has occurred may be cut out of the system for regeneration and replaced by the reactor which was initially blocked out.

The method of effecting catalyst regeneration will be described as applied to the swing reactor 36 but it should be understood that the same procedure may be employed for any one of the other reactors when it is blocked out. When the charge inlet valve in line 35 is closed and while the valve in line 37 remains open, hot hydrogen-rich recycle gas is introduced by line 41 to manifold line 42 and thence through line 35b to strip out any hydrocarbons that may remain in reactor 36, this stripped material being discharged through lines 37, 38, and 25a to line 25. Next the valve in lines 41, 37, and 25a are closed and reactor 36 is depressured by opening the valve in line 43. Next, the reactor is purged to eliminate hydrogen therefrom by introducing flue gas from source 45 via 46, 47, 39 and 37b, the purge gases being vented through lines 35b, 42 and 43. The temperature of the catalyst bed is adjusted to about 650–800° F. preparatory to initiating regeneration by circulating flue gas, under approximately the same pressure as that employed in on-stream processes, i.e., about 300–350 pounds per square inch gage, and controlling flue gas temperature at its source 45 or in regeneration facilities 46. Next, controlled amounts of air are introduced from source 48 into the circulating flue gas stream at a rate to effect combustion of carbonaceous deposits without exceeding a combustion zone temperature of about 1050° F. The hot flue gas leaving reactor 36 at about this temperature is vented via lines 35b, 42, and 43 or is passed by lines 35b, 42 and 50 back to regeneration facilities 46 wherein the gas is scrubbed to eliminate most of the water formed by combustion of hydrocarbonaceous deposits and the net amount of flue gas production is vented from the system through line 51.

If rejuvenation is required (and it may not be required until the catalyst has been regenerated many times) the introduction of flue gas is stopped and the introduction of air is continued so that the catalyst is treated with a circulating air stream at a pressure of about 300 pounds per square inch gage and a temperature of about 950° F. or more for a period of about one-half hour to twelve hours or more depending upon the extent of rejuvenation required. For rejuvenation sufficient air must be added so that the partial pressure of the oxygen is at least 0.4 atmosphere.

After the regeneration (or after rejuvenation if rejuvenation has been effected) the introduction of air is stopped, and flue gas is introduced from source 45 to purge oxygen from the swing reactor and from the regeneration system via line 51 until the oxygen content is reduced below about 1 mol percent. After this high-pressure flue gas purge, the system is depressured by slowly opening the valve in line 43 and flue gas is introduced from source 45 to purge substantially all remaining oxygen from the swing reactor and from the regeneration system. After the flue gas purge, the system may then, preferably, be evacuated and/or purged with startup gas, e.g., methane from source 52, following which hydrogen-rich recycle gas is introduced through lines 40, 39 and 37b. The methane purge serves to separate carbon dioxide in flue gas from hydrogen in recycle gas, and thus avoids formation of carbon monoxide. Preferably, to suppress heat front formation, the methane may contain about 0.5 mol percent hydrogen sulfide. After introduction of recycle gas, the valve in line 37b is closed and the reactor is pressured with hot hydrogen introduced by lines 41, 42 and 35b. When the reactor is thus brought to desired operating pressure, the valves in lines 41 and 35b are closed, and the reactor may be placed on-stream by opening valves in lines 35 and 37.

While our invention has been described with respect to a particular Ultraforming system, it should be understood that it is applicable to other types of platinum catalyst hydroforming systems, regenerative or unregenerative, in which the platinum catalyst may contain adsorbed carbon oxides. Various alternative arrangements and operating conditions will be apparent in the above description to those skilled in the art.

Having thus described our invention, we claim:

1. The method of starting up a naphtha hydroforming zone containing platinum-alumina catalyst with adsorbed carbon oxides at temperatures below about 500° F. which method comprises purging said zone with flue gas, said flue gas containing carbon dioxide and about 0.1 to 1 mol percent oxygen, circulating said flue gas through said zone at a pressure in excess of about 30 pounds per square inch gage while simultaneously heating the circulating flue gas to a temperature above about 500° F., depressuring, introducing at a temperature above about 500° F. and a pressure in excess of about 30 pounds per square inch gage a substantially hydrogen-free startup gas, said startup gas being selected from the group consisting of nitrogen, normally-gaseous hydrocarbons, and mixtures thereof, into said zone, whereby the partial pressure of carbon oxides in said zone is reduced below about 1 pound per square inch absolute, circulating said startup gas through said zone until said zone is at a temperature in the range of about 600 to 800° F., introducing into said zone while the pressure of the startup gas therein is in the range of about 30 to 200 pounds per square inch gage preheated naphtha charge stock at a temperature in the range of 650–800° F., whereby hydrogen is produced, continuing the introduction of naphtha charge stock at a temperature in said range until the partial pressure of hydrogen in said zone reaches at least about 150 pounds per square inch gage, and then increasing the temperature of the naphtha charge to at least about 850° F.

2. The method of claim 1 which includes the step of simultaneously increasing the pressure in said hydroforming zone while the hydrogen concentration therein is being increased to at least 150 pounds per square inch gage.

3. The method of claim 1 wherein said depressuring includes the step of evacuating said hydroforming zone prior to introducing said startup gas.

4. In a regenerative naphtha hydroforming system including a reaction side with lead, intermediate, and tail reaction zones containing platinum-alumina catalyst, heating zones prior to each of said reaction zones, a gas separation zone after said reaction zones, and compression means and lines for recycling separated gas, and including a regeneration side with a source of flue gas and a source of oxygen for regeneration, and valved lines for connecting said regeneration side with said reaction side, the method of start-up from temperatures below about 500° F. which comprises purging said reaction side with flue gas introduced from said regeneration side, circulating flue gas containing about 0.1 to 1 mol percent oxygen, whereby said oxygen concentration assures that the carbon oxides in said flue gas are carbon dioxide, through said reaction side at a pressure in excess of about 30 pounds per square inch gage while simultaneously heating the circulating flue gas to a temperature above about 500° F., depressuring said reaction side, introducing at a temperature above about 500° F. and a pressure in excess of about 30 pounds per square inch gage a substantially hydrogen-free startup gas, said startup gas being selected from the group consisting of nitrogen, normally-gaseous hydrocarbons, and mixtures thereof, into said reaction side whereby the partial pressure of carbon oxides in said reaction side is reduced below about 1 pound per square inch absolute, circulating said startup gas through said reaction side until said reaction side is at a temperature in the range of about 700 to 800° F., introducing preheated naphtha charge stock at a temperature in the range of 700° to 800° F. into at least one of said reaction zones while the pressure of the start-up gas is in the range of about 30 to 200 pounds per square inch gage, whereby hydrogen is produced, continuing the introduction of naphtha charge stock at a temperature in said range until the partial pressure of hydrogen in said reaction side reaches at least about 150 pounds per square inch gage, and then increasing the temperature of the naphtha charge to at least about 850° F.

5. The method of claim 4 wherein depressuring said reaction side includes the step of evacuating said reaction side prior to introducing said startup gas.

6. The method of claim 4 which includes the step, while circulating said start-up gas through said reaction side at a temperature in the range of about 700–800 F., of removing from said start-up gas any water removed from said reaction side by said start-up gas, prior to introducing naphtha into said reaction side.

7. The method of claim 4 which includes the step of initially introducing preheated naphtha charge stock into a reaction zone which is at a higher temperature than the remaining reaction zones.

8. The method of claim 4 in which the reaction side contains a swing reaction zone, which method includes the steps of initially passing preheated naphtha charge stock only through the swing reaction zone so as to provide the hydrogen build-up in the system and subsequently blocking out said swing reaction zone and regenerating catalyst therein.

9. The method of claim 4 wherein, during the step of circulating flue gas through said reaction side while simultaneously heating the circulating flue gas to a temperature above about 500° F., additional flue gas is introduced from said regeneration side to said reaction side and a portion of said circulating flue gas is vented from said reaction side, whereby the buildup of carbon oxides in said circulating flue gas, caused by desorption of carbon oxides from said catalyst, is minimized.

10. In a platinum-alumina catalyst naphtha hydroforming system including lead, intermediate, and tail reaction zones, heating zones prior to each of said reaction zones, a gas separation zone after said reaction zones, and compression means and lines for recycling separated gas, the method of start-up from temperatures below about 500° F. which comprises purging said reaction zones with flue gas containing about 0.2 to 0.5 mol percent oxygen, whereby said oxygen concentration assures that the carbon oxides in said flue gas are carbon dioxide, circulating said flue gas through said reaction zones at a pressure in excess of about 30 pounds per square inch gage while simultaneously heating the circulating flue gas to a temperature in the range of about 700–800° F., continuing circulation of said flue gas through said reaction zones at a temperature in said range while simultaneously cooling said flue gas leaving said tail reaction zone to condense water therefrom and separating the condensed water from said flue gas in said gas separation zone, depressuring, introducing at a temperature in the range of about 700–800° F. and a pressure in excess of about 30 pounds per square inch gage a substantially hydrogen-free start-up gas, said startup gas being selected from the group consisting of nitrogen, normally-gaseous hydrocarbons, and mixtures thereof, into said reaction zones whereby the partial pressure of carbon oxides in said reaction zones is reduced below at least about 1 pound per square inch absolute, introducing preheated naphtha charge stock at a temperature in the range of 700–800° F. into said reaction zones, one of which reaction zones is at a higher temperature than the remaining reaction zones, while the pressure of the start-up gas is in the range of about 30 to 200 pounds per square inch gage, whereby hydrogen is produced, continuing the introduction of naphtha charge stock at a temperature in said range until the partial pressure of hydrogen is increased to at least about 150 pounds per square inch gage, and then increasing the temperature of the naphtha charge to at least about 850° F.

References Cited in the file of this patent

UNITED STATES PATENTS

| | | |
|---|---|---|
| 2,303,083 | Kuhl | Nov. 24, 1942 |
| 2,504,415 | Hepp | Apr. 18, 1950 |
| 2,662,861 | Riblett et al. | Dec. 15, 1953 |
| 2,760,912 | Schwarzenbek | Aug. 28, 1956 |
| 2,880,162 | Moore | Mar. 31, 1959 |